United States Patent [19]

Basterfield et al.

[11] 4,379,513
[45] Apr. 12, 1983

[54] PRESSURE VESSEL FASTENING MEANS

[75] Inventors: Ernest P. Basterfield, Bedfordview; Llewellyn P. Basterfield, Silvermont, both of South Africa

[73] Assignee: Chern Developments (Proprietary) Limited, Edenvale, South Africa

[21] Appl. No.: 274,727

[22] Filed: Jun. 18, 1981

[30] Foreign Application Priority Data

Jun. 30, 1980 [ZA] South Africa ............. 80/3903

[51] Int. Cl.³ .................................... B65D 45/16
[52] U.S. Cl. ........................................... 220/325
[58] Field of Search ............... 220/325, 327, 328, 316; 292/256, 256.65

[56] References Cited

U.S. PATENT DOCUMENTS 2,195,132 3/1940 Nelson .................. 220/325

Primary Examiner—George T. Hall
Attorney, Agent, or Firm—Andrus, Sceales, Starke & Sawall

[57] ABSTRACT

A pressure vessel which is suitable for use as a cooking utensil, autoclave, or like device. The vessel includes a container with a number of pivotal, threaded shanks, and a lid with pairs of supports between which the shanks pass. Wing nuts on the shanks can be tightened to secure the lid to the container. The supports have upturned ends which, when the wing nuts are slackened to a limited extent prevent pivotal disengagement of the shanks from the supports.

5 Claims, 3 Drawing Figures

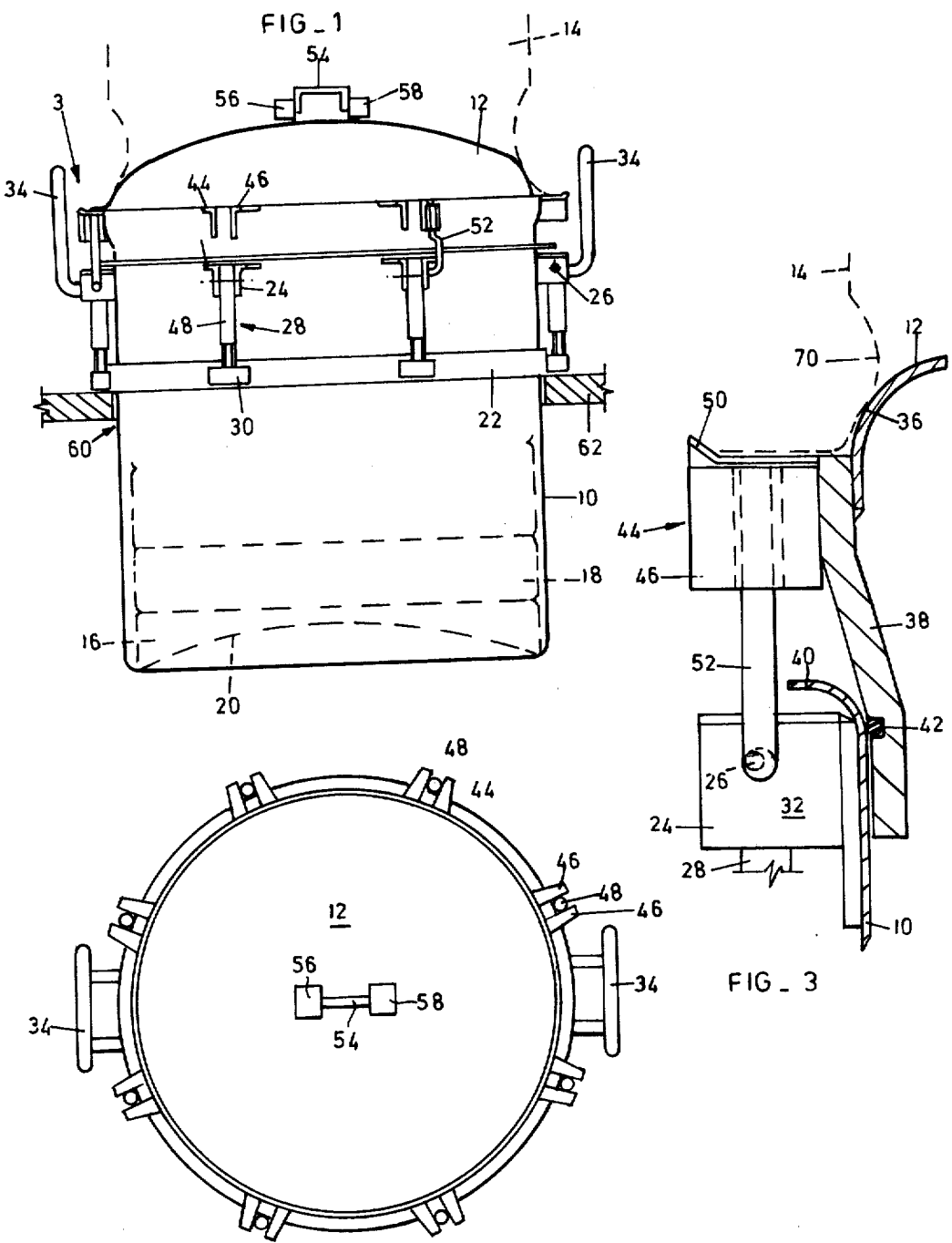

PRESSURE VESSEL FASTENING MEANS

BACKGROUND OF THE INVENTION

This invention relates to a pressure vessel suitable for use as a cooking utensil, autoclave or like device.

SUMMARY OF THE INVENTION

The invention provides a pressure vessel comprising a container, a lid sealingly engageable with the container, and means for securing the lid to the container in an air tight manner, the securing means being adjustable to a position at which excess pressure can escape from the container and at which the lid is still secured to the container.

In one form of the invention the securing means includes a plurality of brackets on one of the lid or container, and a plurality of clamping devices which are on the other of the lid or container and which are engageable with the brackets for drawing the lid towards the container, the brackets including formations which permit a degree of release of the clamping devices but which prevent disengagement of the clamping devices from the brackets.

Preferably each bracket includes two supports which are spaced from each other and fixed to the lid, extending radially outwardly from the lid, the outer end of each support including an upwardly extending formation, and each clamping device includes a threaded shank which is pivotally movable into the space between the two supports, and a member threadedly engaged with the shank which is screwed down to secure the lid to the container, the upwardly extending formations on the supports preventing pivotal movement of the shank out of the space when the threaded member is below a first position on the shank. The container is preferably formed with an inwardly domed or concave bottom to increase its pressure resistance capability.

Further according to the invention the lid includes an O-ring peripherally secured to it which forms a seal against the inner upper wall of the container.

Further according to the invention the container includes at least one outwardly extending peripheral formation which engages with the rim of a hole in a support plate into which the container is inserted. This formation may consist of a circular band fixed peripherally to the container.

The pressure vessel of the invention is intended primarily for use as a pressure cooker but it finds ready use as an autoclave or similar device and the invention is intended to cover an application of this type.

DESCRIPTION OF THE DRAWINGS

The invention is further described by way of example with reference to the accompanying drawings wherein:

FIG. 1 is a side view of a pressure vessel according to the invention,

FIG. 2 is a plan view of the vessel of FIG. 1, and

FIG. 3 is an enlarged sectional view of a portion of the vessel of FIG. 1 which is marked with the numeral 3.

DESCRIPTION OF A PREFERRED EMBODIMENT

The drawings illustrate a pressure vessel which includes a lower container 10, a lid 12 and, optionally, an upper container 14, a base 16 and stackable receptacles 18, shown in dotted outline in FIG. 1.

The container 10 is cylindrical and is made from stainless steel and has an inwardly domed base 20 to increase its capability to withstand pressure. A sealing ring 22 is peripherally secured to the container 10 at an intermediate location. The fact that the container is cylindrical, as opposed to being tapered, prevents it from being stacked with a similar container, a practice which is dangerous with pressure vessels.

A number of spaced brackets 24 are fixed to the container near its mouth. Each bracket has a swivel pin 26 (see FIG. 3) which supports a pivotal clamp bolt 28 which is fitted with a wing nut 30.

Two handles 34 are fixed to the container.

The lid 12, as best seen in FIG. 3, includes a domed section 36 which is welded inside a tapered lid band 38. The lid is also made from stainless steel. The mouth of the container 10 is flared outwardly at 40 and the lid band 38 fits easily inside the flared section. An O-ring seal 42 located in a peripheral groove in the lid band 38 abuts the flared section to form a seal.

Lid brackets 44 are fixed to the lid in register with the brackets 24 on the container. Each bracket includes two spaced angular supports 46 and the shank 48 of a clamp bolt 28 is insertable between the supports. As shown in FIG. 3 the free edges 50 of the supports 46 are turned up.

Every second bracket 44 has a hook shaped safety clamp 52 fixed to it.

The lid has a handle 54 which forms two housings 56 and 58 for a pressure gauge and a pressure relief valve respectively.

The lid when placed on the container is engaged with it by rotating the lid so that the hook shaped clamps 52 abut the side faces 32 of the brackets 24. Thereafter each clamp bolt 28 is pivoted upwardly so that the shank 48 passes between the supports 46 whereafter the wing nuts 30 are tightened to secure the lid to the container.

This method of construction provides a double safety factor. Firstly when the wing nuts 30 are slackened the lid 12, if under pressure, can rise slightly to permit pressure release but the bolts 28 can only be disengaged completely from the brackets 46 when the wing nuts have been screwed upwardly so that they, or washers below, clear the turned up free edges 50 of the supports.

Secondly the lid can be moved axially, relatively to the container, to a limited extent only and thus cannot be removed unless it is rotated slightly to disengage the hook shaped clamps 52 from the brackets 24.

The vessel may be inserted into an opening 60 of suitable size formed in a plate 62 of a stove, or other apparatus. The ring 22 then retains the vessel at the correct depth in the opening 60.

The upper surfaces of the supports 46 are fairly broad and form an adequate base on which the upper container 14, when inverted, can rest. This container is formed with a flange at its mouth and if the clamp bolts 28 are subsequently engaged with the brackets 44 on the lid the wing nuts 30 bear on the flange and securely fix the container 14 to the container 10. The container 14 is swaged inwardly at 70, slighly below the flange, to permit free rotation of the wing nuts. This arrangement is particularly suitable for transport of the pressure vessel and lends itself to incorporation in mobile kitchens and the like. The container 14 may itself be used for cooking or other purposes.

The base 16 when located inside the container 10 enables the assembly of stacked receptacles 18 to be stably positioned in the container. The receptacles may be perforated and depending on the application may be used for different types of food.

In the preceding description the lid is described as being fabricated from two parts. It could alternatively be made from a single pressing. Similarly the ring 22 could be replaced by formations integral with the container.

The clamp bolts 28 have fitted to them washers, not shown, on which the wing nuts 30 bear as they are screwed down. To prevent the washers from sliding down the shanks of the bolts, the shanks are made with enlarged diameter sections which catch the washers.

Thus when the clamp bolts are pivoted upwardly the washers, resting on the enlarged sections, abut the supports 46, and prevent the shanks from passing between the supports until the washers are raised to their correct positions above the supports 46. The shanks then engage with the supports and the wing nuts can be tightened. The wing nuts can therefore be tightened only when the washers are correctly located on the supports.

We claim:

1. A pressure vessel comprising a container, a lid sealingly engageable with the container, and means for securing the lid to the container in an air tight manner, the securing means comprising a plurality of brackets on the lid and a plurality of clamping devices which are on the container, each bracket including two supports which are spaced from each other and fixed to the lid, extending radially outwardly from the lid, the outer end of each support including an upwardly extending formation, and each clamping device including a threaded shank which is pivotally movable into the space between the two supports, and a member threadly engaged with the shank which is screwed down to secure the lid to the container, the upwardly extending formations on the supports permitting a degree of release of the clamping device and preventing pivotal movement of the shank out of the space when the threaded member is below a first position on the shank, so that excess pressure can escape from the container while the lid is still secured to the container.

2. A pressure vessel according to claim 1 wherein the lid and the container include formations which are interengageable on rotation of the lid relatively to the container to a position at which the brackets are respectively in register with the clamping devices, the interengaged formations then limiting axial movement of the lid relatively to the container.

3. A pressure vessel according to claim 1 wherein the lid includes an O-ring peripherally secured to it which forms a seal against the inner upper wall of the container.

4. A pressure vessel according to claim 1 wherein the container is formed with an inwardly domed bottom.

5. A pressure vessel according to claim 1 in combination with a receptacle, the receptacle including an outwardly extending flange at its mouth which, when the receptacle is inverted, rests on the supports, the members which are threadedly engaged with the shanks engaging with the flange and securing the receptacle and the lid to the container.

* * * * *